(12) United States Patent
Barny et al.

(10) Patent No.: US 10,589,359 B2
(45) Date of Patent: Mar. 17, 2020

(54) APPARATUS AND METHOD FOR ENLARGING INNER DIAMETER OF INJECTOR FOR REACTOR

(71) Applicant: ExxonMobil Research and Engineering Company, Annandale, NJ (US)

(72) Inventors: Christopher Barny, Baytown, TX (US); William R. Trousdale, Baytown, TX (US); Andrew J. Naprawa, Baytown, TX (US); Cheryl A Dzurec, Houston, TX (US); Matt O. Lawrence, Humble, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 16/007,142

(22) Filed: Jun. 13, 2018

(65) Prior Publication Data

US 2018/0369932 A1 Dec. 27, 2018

Related U.S. Application Data

(60) Provisional application No. 62/525,461, filed on Jun. 27, 2017.

(51) Int. Cl.
*B23B 35/00* (2006.01)
*B23B 47/28* (2006.01)
(Continued)

(52) U.S. Cl.
CPC ............ *B23B 35/00* (2013.01); *B23B 41/006* (2013.01); *B23B 47/00* (2013.01); *B23B 47/281* (2013.01);
(Continued)

(58) Field of Classification Search
CPC ....... B23B 47/281; B23B 47/28; B23B 47/00; B23B 2247/12; B23B 35/00; B23B 41/006; B23B 41/003; B23B 51/009; B23B 51/0018; B23B 51/0054; B23B 51/0036; B23B 2251/60; B23Q 11/10
See application file for complete search history.

(56) References Cited

U.S. PATENT DOCUMENTS

| 967,789 A * | 8/1910 | Le Baron .............. B23B 51/107 |
| | | 279/83 |
| 1,843,181 A * | 2/1932 | Stougaard ................ B23C 3/05 |
| | | 408/83.5 |

(Continued)

FOREIGN PATENT DOCUMENTS

WO WO-2015021492 A1 * 2/2015 ........... B23B 41/006

OTHER PUBLICATIONS

The International Search Report and Written Opinion of PCT/US2018/037229 dated Sep. 20, 2018.

*Primary Examiner* — Eric A. Gates
*Assistant Examiner* — Chwen-Wei Su
(74) *Attorney, Agent, or Firm* — Hsin Lin; Chad A. Guice

(57) ABSTRACT

A drill assembly and method is provided for enlarging an injector of a reactor. The drill assembly includes an elongated shaft attached to a piloted drill bit including a pilot portion distal from and extending colinearly with the elongated shaft and a cutting portion proximal the elongated shaft and positioned between the pilot portion and the elongated shaft, wherein the cutting portion includes at least one cutting edge extending radially from a center axis of rotation beyond an outer surface of the pilot portion; and a drive device adapted to rotate the elongated shaft about the axis of rotation. The method includes inserting the pilot portion into an injector; and cutting away a portion of an inner surface of the injector with the cutting portion.

19 Claims, 5 Drawing Sheets

(51) Int. Cl.
*B23B 47/00* (2006.01)
*B23B 41/00* (2006.01)
*B23B 51/10* (2006.01)
*B23B 51/00* (2006.01)

(52) U.S. Cl.
CPC ........ *B23B 51/107* (2013.01); *B23B 51/0018* (2013.01); *B23B 2215/24* (2013.01); *B23B 2251/60* (2013.01)

(56) References Cited

U.S. PATENT DOCUMENTS

| | | | | |
|---|---|---|---|---|
| 2,066,136 | A | * | 12/1936 | Burston .................... B23C 3/05 29/33 K |
| 2,295,856 | A | * | 9/1942 | Mallory ................. B23D 77/00 408/82 |
| 2,334,795 | A | | 11/1943 | Smith |
| 2,822,607 | A | | 2/1958 | Bennett |
| 2,956,456 | A | * | 10/1960 | Bisceglia .......... B23B 29/03446 408/82 |
| 3,028,772 | A | | 4/1962 | Mossberg |
| 3,782,847 | A | * | 1/1974 | Kulzer .................... B23Q 1/38 408/1 R |
| 4,053,249 | A | | 10/1977 | Ness et al. |
| 4,630,977 | A | * | 12/1986 | Theofanous ............ B23B 31/08 408/127 |
| 10,040,127 | B2 | * | 8/2018 | Frota de Souza Filho .................. B23B 29/022 |
| 2006/0233620 | A1 | | 10/2006 | Herrick |
| 2013/0206441 | A1 | * | 8/2013 | Roser .................... B05B 17/063 173/199 |

* cited by examiner

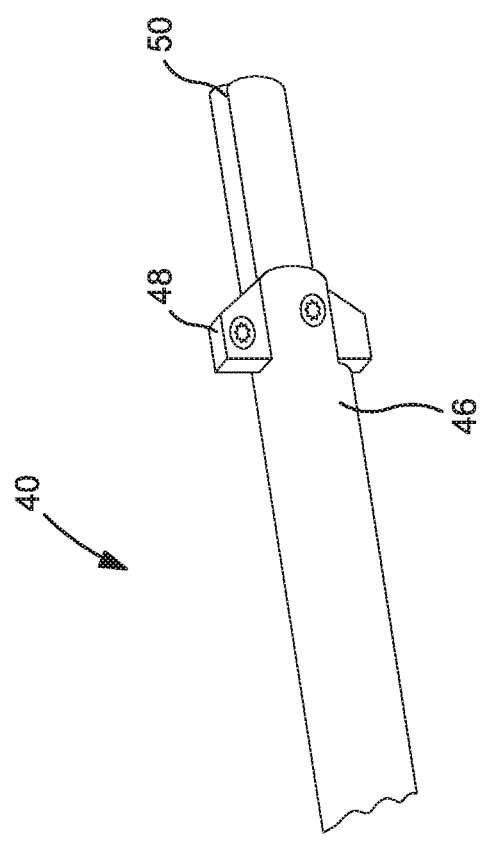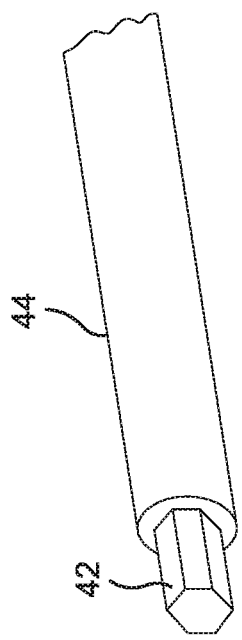
FIG. 2

APPARATUS AND METHOD FOR ENLARGING INNER DIAMETER OF INJECTOR FOR REACTOR

CROSS-REFERENCE TO RELATED APPLICATIONS

This application claims priority to U.S. Provisional Application Ser. No. 62/525,461 filed Jun. 27, 2017, which is herein incorporated by reference in its entirety.

FIELD

The present invention relates to an apparatus and method for enlarging the inner diameter of an injector for a reactor.

BACKGROUND

When debottlenecking certain processes, it may be determined that a process is limited by an injection rate to a reactor. Typically, if such a determination is made, a larger injector supporting a higher injection rate might be added to the reactor during a shutdown of the reactor. A shutdown condition is typically required so that the existing injection nozzle can be removed and the new one can be added. This is because under operating conditions the reactor may be operating under pressure, operating at high temperatures, and/or containing reactants, products or catalysts that are hazardous. Nevertheless, shutting down a reactor for debottlenecking imposes lost run time and other costs.

Enlarging an injection nozzle during operation of a reactor poses many challenges. In addition to the aforementioned challenging reaction conditions, access to the injection nozzle is often limited, particularly in the case of fluid coking or FLEXICOKING process reactor nozzles. Such nozzles may be 3 to 8 feet from the service port of the nozzle. In addition, the breaking of a tool or the nozzle itself during a nozzle enlargement process could ultimately require the reactor to be shut down for repair. Accordingly, the risks and challenges with performing an injector enlargement while the reactor is online may be too significant, causing many to accept the costs of a reactor shut down.

It would therefore be desirable to provide an apparatus and method for enabling the enlargement of a reactor nozzle while the reactor is online while mitigating or avoiding the risks of performing such an operation.

SUMMARY

In one aspect, a method is provided for enlarging an injector of a reactor. The method may include providing a drill assembly comprising: an elongated shaft attached to a piloted drill bit including a pilot portion distal from and extending colinearly with the elongated shaft and a cutting portion proximal the elongated shaft and positioned between the pilot portion and the elongated shaft, wherein the cutting portion includes at least one cutting edge extending radially from a center axis of rotation beyond an outer surface of the pilot portion; and a drive device adapted to rotate the elongated shaft about the axis of rotation. The method may further include inserting the pilot portion into an injector; and cutting away a portion of an inner surface of the injector with the cutting portion.

In another aspect, a drill assembly is provided for enlarging an injector of a reactor. The drill assembly may include an elongated shaft attached to a piloted drill bit including a pilot portion distal from and extending collinearly with the elongated shaft and a cutting portion proximal the elongated shaft and positioned between the pilot portion and the elongated shaft, wherein the cutting portion includes at least one cutting edge extending radially from a center axis of rotation beyond an outer surface of the pilot portion; a drive device adapted to rotate the elongated shaft about the axis of rotation; and a drill support including: at least one releasable fastener for releasably securing the drill support to the exterior surface of the injector; a drive device mount for securing the drive device to the drill support; and an elongate member to which the drive device mount and at least one releasable fastener are secured.

DRAWINGS

FIG. 2 is a perspective view, illustrating an elongated shaft attached to a piloted drill bit according to one or more embodiments of the present disclosure.

DETAILED DESCRIPTION

Figure 1:
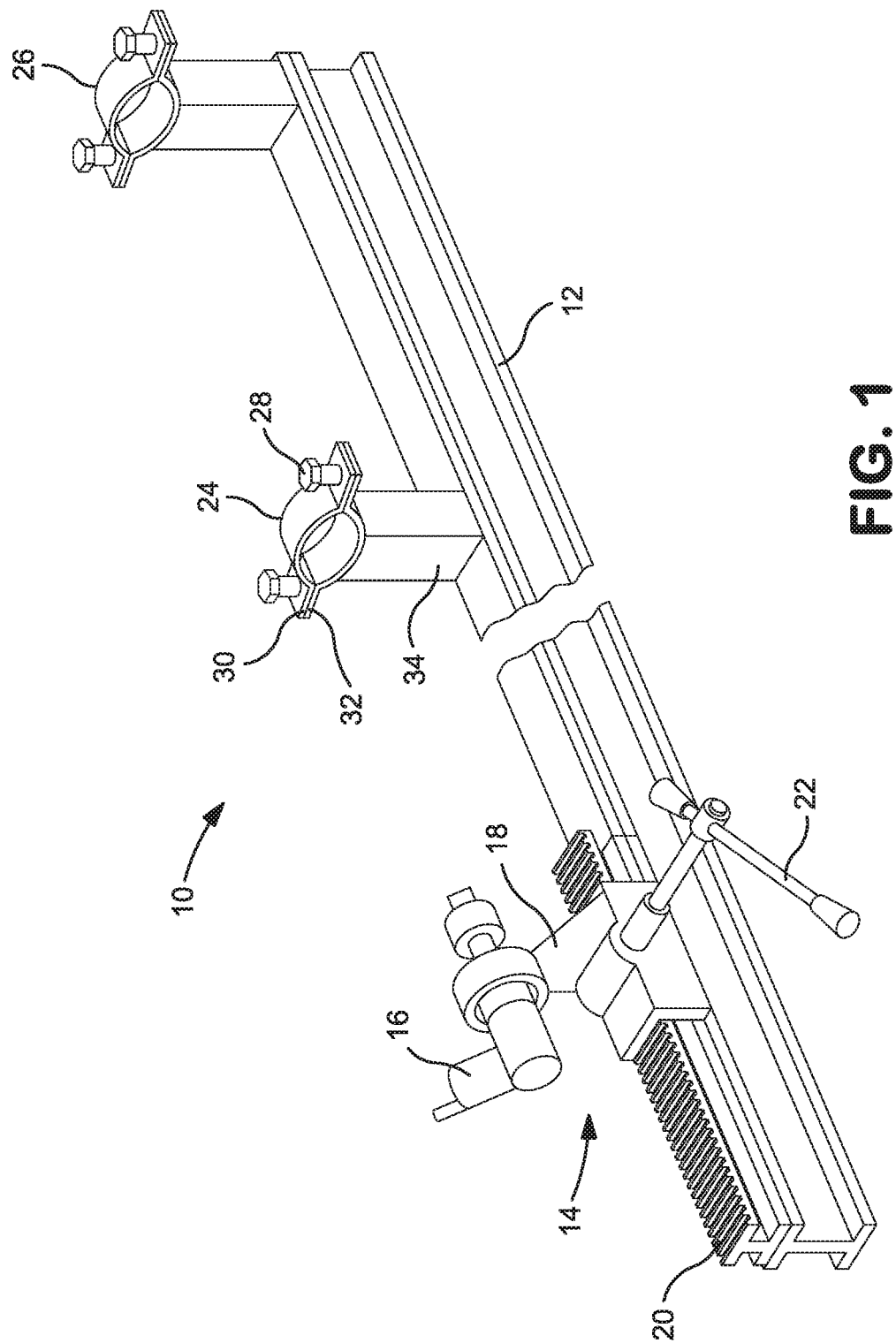
FIG. 1 is a perspective view, illustrating a drill support according to one or more embodiments of the present disclosure.

An apparatus and method for enlarging the inner diameter of an injector are disclosed. Advantageously, the apparatus may be employed to enlarge the diameter of an injector while the reactor is online without requiring a reactor shutdown. In addition, the apparatus and method may mitigate or eliminate many of the risks normally posed by performing an injector replacement while the reactor is online. For example, the apparatus may be employed without releasing reactor pressure or the contents of the reactor. Furthermore, if a mechanical or structural failure of the apparatus were to occur, operation of the reactor may not be interrupted.

These and other advantages may be provided by a drill assembly that includes an elongated shaft attached to a piloted drill bit. The piloted drill bit includes a pilot portion distal from and extending collinearly with the elongated shaft and a cutting portion proximal the elongated shaft and positioned between the pilot portion and the elongated shaft. The cutting portion includes at least one cutting edge extending radially from a center axis of rotation beyond an outer surface of the pilot portion. The drill assembly may also include a drive device adapted to rotate the elongated shaft about the axis of rotation. The drill bit may include a spade bit that has two cutting edges. The spade bit may be attached to the elongate shaft with fasteners.

The drill assembly may also include a drill support that includes at least one releasable fastener for releasably securing the drill support to the exterior surface of the injector. The drill assembly may also include a drive device mount for securing the drive device to the drill support; and an elongate member to which the drive device mount and at least one releasable fastener are secured. The releasable fastener may be a clamping fastener that clamps around the exterior surface of the injector. The drill support may also include a linear press for attaching the drive device mount to the elongate member. The linear press allows the mount drive device to move controllably and linearly in an elongate direction along the elongate member.

The method for enlarging the injector may include inserting the pilot portion of the drill bit into the injector, such as by inserting the drill bit through a service port of the injector. The drive device may be actuated to rotate the elongate shaft and cause the cutting edge of the drill bit to engage and cut away a portion of the inner surface of the injector, thereby increasing its inner diameter.

In any embodiment, the drill support may first be attached to an exterior surface of the injector to facilitate precise drilling of the injector. The drive device may be attached to the drive device mount and the elongated shaft may be attached to the drill device. The elongated shaft may be positioned such that the pilot portion inserts at least partially into the injector. The drive device may be actuated and the linear press may be actuated to move the drive device in the elongate direction and thereby cutting away the portion of the inner surface of the injector. Self-lubricating pump packing can be disposed around the elongated shaft inside the injector to allow for injecting steam into the injector while cutting away the portion of the inner surface of the injector.

Figure 3:
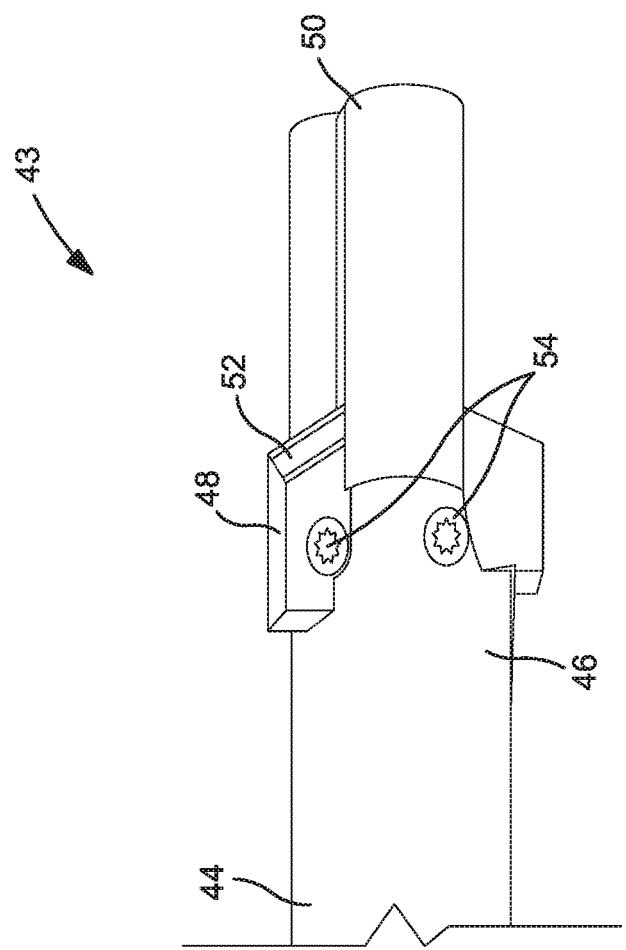
FIG. 3 is a detail view, illustrating a piloted drill bit according to one or more embodiments of the present disclosure.

An exemplary embodiment of a drill assembly is illustrated in FIGS. 1-3. As illustrated in FIG. 1, a drill support 10 may generally include an elongate member 12, which may be structurally rigid. For example, the elongate member 12 may generally be an I-shaped beam or rod. Although not shown, the elongate member may be "skeletonized" to be strong and lightweight. The drill support may have a drill press 14 at one end distal to the end that attaches to the injector. The drill press 14 may include a drive device mount 18 for supporting a drive device 16, such as a pneumatic drill. The drive device mount 18 also serves as a carriage for allowing the drive device to move linearly and controllably along the elongate member when actuated. The drill press 14 may include a linear gear 20 that interfaces with a rotating gear that turns with the rotation of a handle 22 as shown in FIG. 1.

The drill support 10 also includes a pair of releasable fasteners 24, 26 for releasably securing the drill support to an exterior surface of the injector. The releasable fasteners 24, 26 may be clamp-type fasteners including first and second clamping members 30, 32 that can be tightened against exterior surface of the injector by adjustment of one or more tighteners 28. Each releasable fastener may be attached to the elongate member 12 by a standoff 34 to insure precise alignment of the drill bit and axis of rotation with the center axis of the interior of the injector.

As illustrated in FIG. 2, the drill assembly includes drill piece 40, which includes an elongate shaft 44 having a shank 42 for engagement with the drive device 16. The elongate shaft may be made of various materials, such as stainless steel. It may also be coated, such as with tungsten carbide. On the opposite end 46 of elongate shaft 44 is a piloted drill bit, which includes a cutting blade 48 and a pilot portion 50. In FIG. 3, I the cutting blade 48 may be a spade-type cutting bit having one more cutting edges 52, preferably two cutting edges, extending radially for the center axis of rotation of the elongate shaft 44. The pilot portion 50 extends beyond the cutting blade 48, for example by at least an inch, to help maintain alignment of the cutting blade with the center axis of the injector. The drill bit 43 is held together by fasteners 54 which join the pilot portion 50 and the cutting blade 48 to the end 46 of the elongate shaft 44. Advantageously, upon structural failure of a fastener 54, or cutting blade 48, the broken portions of the drill bit 43 would not entirely obstruct the flow through the injector.

Figure 4:
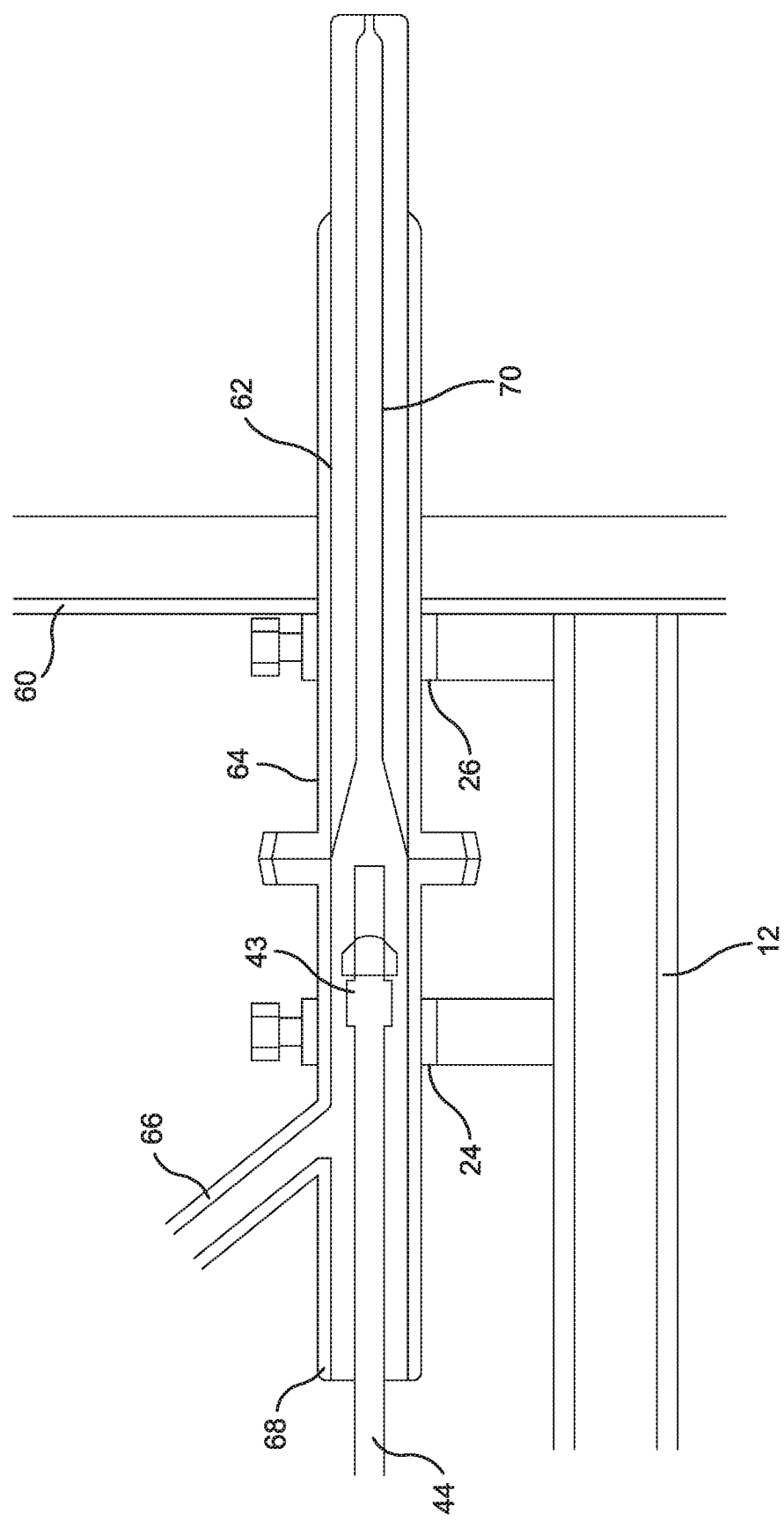
FIG. 4 is a section view, illustrating the attachment of a drill support to the exterior surface of an injector for a reactor according to one or more embodiments of the present disclosure.

FIG. 4 illustrates how the drill assembly may interface with an injector 62 of a reactor. It should be appreciated that some of the features of the injector have been omitted for simplification, such as the packing gland or pump packing and steam injection ports. The reactor which is defined by a reactor wall 60, which has multiple injectors 62 protruding therethrough. The injector 62 has an interior surface 70 surface defining a flowpath for a feed to the reactor, such as a hydrocarbon feed. The injector 62 also includes a feed inlet 66 and a service port 68 outside of the reactor.

To employ the apparatus to enlarge the injector, the elongate member 12 of the drill support may be placed against the reactor wall 60 and the releasable fasteners 24 and 26 are tightened around the exterior surface 64 of the injector. By attaching the drill support in this manner, it may be locked in position such that elongate shaft 44 is positioned within the injector 62 with its center axis of rotation in precise alignment with center axis of the flowpath of injector 62 and the drill bit 43 is positioned in precise alignment for enlarging the interior diameter of injector 62.

Figure 5:
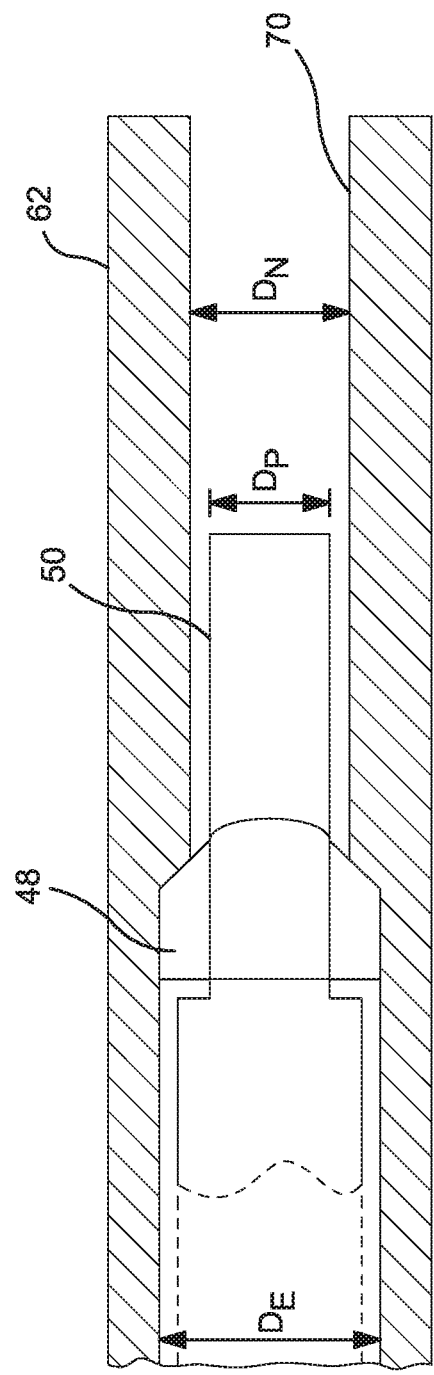
FIG. 5 is a section view, illustrating the operation of a piloted drill bit according to one more embodiments of the present disclosure.

As illustrated in greater detail in FIG. 5, in operation the pilot portion 50 is sized to fit within the original inner surface 70 of the injector 62. In other words, the outer diameter of the pilot portion, DP, is smaller than the inner diameter, DN, of the original inner surface 70. The cutting blade 48 cuts away a portion of the inner surface 70 as it rotates about its axis of rotation and travels down the length of the injector 62, resulting in a new enlarged inner diameter, DE.

The pilot portion 50 is preferably at least 0.5 inches, or more preferably at least 1 inches in length, measured along the center axis of rotation, to help stabilize the cutting blade 48. The difference in diameter between the outside diameter of the pilot portion and the inner diameter of the injector prior to cutting away the portion of the inner surface, i.e., DN minus DP is preferably about 0.1 inches or less or even more preferably about 0.05 inches or less or about 0.025 or less. Advantageously, the apparatus may be employed to enlarge the inner diameter (i.e., DE minus DN) of the injector by at least 0.05 inches, or at least 0.1 inches, or at least 0.15 inches.

EXAMPLE

An apparatus similar to that depicted in FIGS. 1-5 was used to enlarge an injector on a fluid coking reactor while the reactor was online. The injector had an original inside diameter of 0.4 inches and was enlarged to approximately 0.572 inches. The inside of the reactor is normally maintained at roughly 1000 F and the tip of the injector nozzle was approximately 5 feet away from the service port of the injector.

A pneumatic drive device was employed to avoid electric sparks in the area of the reactor. The drill bit included a spade bit for cutting the designed diameter and included a pilot portion that was approximately 1.25 inches in length and a diameter of approximately 0.38 inches.

Feed to the injector nozzle was shut down, and the injector nozzle was subjected to 600 lb steam for 30 minutes prior to drilling for pretreatment.

In order to allow smoother tool rotation, the packing gland of the injector was replaced with a self-lubricating pump packing and 150 lb steam was injected into the steam ports to prevent leakage of the reactor contents and provide for cooling of the tool.

A drill support similar to that which is depicted in FIG. 1 was attached to the exterior surface of the injection nozzle as depicted in FIG. 4, and the elongate shaft was inserted through the service port and through the self-lubricated pump packing. The drive device was then engaged and the drill press was slowly and evenly actuated to complete the drilling of the nozzle in approximately 15 minutes. The nozzle was successful drilled without breaking the drill bit.

The invention claimed is:

1. A method of enlarging an injector of a reactor, comprising:
   securing a drill assembly to an exterior surface of the injector protruding through and extending from an exterior wall of the reactor, the drill assembly including:
      an elongated shaft;
      a piloted drill bit attached to an end of the elongated shaft and including a pilot portion distal from and extending colinearly with the elongated shaft and a cutting portion proximal the end of the elongated shaft and positioned between the pilot portion and the end of the elongated shaft, wherein the cutting portion includes at least one cutting edge extending radially from a center axis of rotation beyond an outer surface of the pilot portion; and
      a drive device mounted to an elongate member and adapted to rotate the elongated shaft about the axis of rotation;
   advancing the drive device along the elongate member and thereby inserting the pilot portion into the injector; and
   actuating the drive device to cut away a portion of an inner surface of the injector with the cutting portion as the drive device advances along the elongate member.

2. The method of claim 1, wherein securing the drill assembly to an exterior surface of the injector comprises releasably securing the drill assembly to the exterior surface of the injector with at least one releasable fastener.

3. The method of claim 2, wherein the drill assembly further includes a standoff extending between the at least one releasable fastener and the elongate member.

4. The method of claim 2, wherein the at least one releasable fastener is a clamping fastener that clamps around the exterior surface of the injector.

5. The method of claim 1, wherein advancing the drive device along the elongate member comprises moving the drive device controllably and linearly in an elongate direction along the elongate member with a linear press that attaches the drive device to the elongate member.

6. The method of claim 5, wherein actuating the drive device to cut away the portion of the inner surface of the injector with the cutting portion comprises actuating the drive device and the linear press to move the drive device in the elongate direction and thereby cutting away the portion of the inner surface of the injector.

7. The method of claim 1, wherein the piloted drill bit comprises a spade bit including the at least one cutting edge.

8. The method of claim 7, wherein the spade bit is attached to the elongated shaft with fasteners.

9. The method of claim 1, further comprising injecting steam into the injector while cutting away the portion of the inner surface of the injector.

10. The method of claim 1, wherein the pilot portion has an outer diameter that is smaller than an inner diameter defined by the inner surface of the injector.

11. The method of claim 10, wherein the difference in diameter between the outside diameter of the pilot portion and the inner diameter of the injector prior to cutting away the portion of the inner surface is less than 0.1 inches.

12. The method of claim 1, wherein the pilot portion is at least 1 inches long along the center axis of rotation.

13. The method of claim 1, wherein the injector has an inner diameter defined by the inner surface of the injector and wherein the inner diameter is enlarged by at least 0.05 inches after cutting away the portion of the inner surface of the injector.

14. The method of claim 13, wherein the injector is enlarged by at least 0.1 inches.

15. The method of claim 1, wherein the reactor is not shut down when cutting away the portion of the inner surface of the injector.

16. The method of claim 1, wherein the elongate shaft is at least 3 feet long.

17. The method of claim 1, wherein the elongated shaft comprises a tungsten carbide coating.

18. The method of claim 1, wherein securing the drill assembly to the exterior surface of the injector is preceded by placing an end of the elongate member against the exterior wall of the reactor.

19. The method of claim 18, wherein the injector includes a feed inlet outside of the reactor, and wherein placing the end of the elongate member against the wall of the reactor is preceded by:
   shutting off feed to the reactor via the feed inlet; and
   subjecting the injector to steam for a predetermined period of time.

* * * * *